(12) United States Patent
Hansen

(10) Patent No.: US 7,401,388 B2
(45) Date of Patent: Jul. 22, 2008

(54) RIB CLIP

(75) Inventor: Wayne M. Hansen, Chippewa Falls, WI (US)

(73) Assignee: Illinois Tool Works Inc., Glenview, IL (US)

( * ) Notice: Subject to any disclaimer, the term of this patent is extended or adjusted under 35 U.S.C. 154(b) by 113 days.

(21) Appl. No.: 11/219,920

(22) Filed: Sep. 6, 2005

(65) Prior Publication Data

US 2007/0050955 A1 Mar. 8, 2007

(51) Int. Cl.
- *A44B 1/04* (2006.01)
- *E04F 19/02* (2006.01)
- *F16B 5/12* (2006.01)
- *F16B 5/06* (2006.01)

(52) U.S. Cl. .................................. 24/297; 24/292

(58) Field of Classification Search ............. 24/291, 24/292, 293, 294, 295, 458, 573.09, DIG. 32, 24/DIG. 33; 293/155; 52/716.7

See application file for complete search history.

(56) References Cited

U.S. PATENT DOCUMENTS

| 6,074,150 | A | * | 6/2000 | Shinozaki et al. | 411/508 |
| 6,317,937 | B1 | * | 11/2001 | Ishihara et al. | 24/297 |
| 6,449,814 | B1 | * | 9/2002 | Dinsmore et al. | 24/297 |
| 6,665,914 | B2 | * | 12/2003 | Ogawa | 24/297 |
| 2003/0200634 | A1 | * | 10/2003 | Hansen | 24/297 |

* cited by examiner

*Primary Examiner*—Robert J Sandy
(74) *Attorney, Agent, or Firm*—Mark W. Croll; Paul F. Donovan

(57) ABSTRACT

A rib clip for connecting first and second components is provided with first and second legs deflectable relative to each other. One leg is substantially straight and includes a shelf. The other leg is bent and includes inner and outer arms biased against a component held between the legs. The rib clip is inserted in a window of the other component, which compresses the legs toward each other, securing the first and second components relative to each other.

19 Claims, 2 Drawing Sheets

RIB CLIP

FIELD OF THE INVENTION

The present invention relates generally to fastening or retaining clips used for completing blind connections between a first panel or component and a second panel or component.

BACKGROUND OF THE INVENTION

Connecting interior panels of automobiles to the metal framework of the automobile often involves the completion of so-called "blind" connections. A blind connection is one that must be completed without the assembler being able to see the fastener or the component to which the fastener is being connected. Fasteners of different styles and configurations, often referred to as a "clip", have been developed for completing blind connections in automobile assemblies as well as other assemblies.

For example, it is known to use a simple metal retaining clip that can be received within a window or aperture formed through a first panel or structure and that will engage therein a protrusion or formation that extends from an undersurface of the second panel or structure. Such metal retaining clips have been used successfully to hold components together, but have certain inadequacies in some applications and uses. For example, as a result of the natural vibrations in the vehicle, the abrasive nature of a metal retaining clip can wear through the paint or anti-corrosive coating of the primary panel, thereby promoting corrosion. Even specially coated metal clips can rust under extreme conditions, causing unsightly stains and a loss in performance. Further, metal retaining clips have a tendency to buzz, squeak and rattle, a condition sometimes referred to as "BSR".

To reduce or eliminate BSR, and to inhibit corrosion plastic fastening clips have been used in place of prior art metal retaining clips. However, plastic fastening clips have tended to be relatively complex, requiring specialized tooling and molding operations, and have required relatively high insertion forces to seat the fastener properly in one or both parts. Some known plastic clips have provided less than desirable retention performance. Some have required relatively complex and difficult to manufacture special features for attachment to the clip.

An improved rib clip is disclosed in U.S. Pat. No. 6,796, 006 entitled "Rib Clip", which is commonly assigned to the assignee of this application. The rib clip disclosed therein is constructed of non-abrasive materials such as plastic, and is relatively simple to manufacture. The rib clip requires relatively low insertion force for proper seating. The rib clip of this patent has met with success in applications such as fastening plastic trim to an underlying substrate of an automobile. However, it is difficult to provide a fastener of the type shown in U.S. Pat. No. 6,796,006 in relatively small sizes. The rib clip of the '006 patent has worked well for fastening in slot widths down to about 6.0 mm. However, the clip has been difficult to use for installations requiring slot widths less than about 6.0 mm.

Accordingly, it is desirable to provide a rib clip that can be mounted in small openings and that will secure a first component to a second component easily and securely.

SUMMARY OF THE INVENTION

The present invention provides a rib clip having locking features provided from a substantially one side to be received in a window of a first component and to receive a component internally.

In one aspect thereof, the present invention provides a connecting clip with first and second legs connected at one end of the clip and defining a clip entrance therebetween at an opposite end of the clip. The first leg has an inner surface and a lateral support surface projecting from the inner surface. An arm extending from the second leg near the entrance extends toward the first leg and defines a ledge having a ledge support surface near the lateral support surface.

In another aspect thereof, the present invention provides an assembly of a first component and a second component interconnected by a rib clip. The first component defines a first window and the second component defines a second window. The rib clip has a first leg and a second leg connected at one end by a transition, with spaced distal ends defining an entrance. The clip is disposed in the first window of the first component, with the first component biasing the first and second legs toward each other. The second component is disposed between the first leg and the second leg. The first leg has a first leg inner surface and a lateral support surface projecting from the first leg inner surface and disposed in the second window. An arm extends from the second leg near the entrance toward the first leg and defines a ledge having a ledge support surface near the lateral support surface and disposed in the second window.

In yet another aspect thereof, the present invention provides a one-sided rib clip with first and second legs connected at one end of the clip and defining a clip entrance therebetween at an opposite end of the clip. The first leg is substantially straight and has a first leg inner surface. A shelf disposed on the first leg inner surface has a shelf support surface facing the connected ends of the legs and an angled face toward the entrance. The second leg has proximal and distal segments relative to the connected end of the clip. The segments define a nonlinear angle. An inner arm connected to the proximal segment of the second leg extends toward the entrance substantially parallel to the first leg. An outer arm extends from the distal segment angularly away from the entrance and toward the shelf. The outer arm defines a ledge at the end thereof. The ledge includes a support surface and a wall.

An advantage of the present invention is providing a rib clip that can be manufactured and used for installation of small components.

Another advantage of the present invention is providing a rib clip that can be installed easily, with minimal force, and of that engages first and second components securely to inhibit unintended detachment.

Still another advantage of the present invention is providing a rib clip that reduces BSR by clamping tightly against components held therein.

Yet another advantage of the present invention is providing a rib clip that can be installed in a simple opening in a first component, and that receives and holds a second component without requiring a complex connecting structure on either component.

Other features and advantages of the invention will become apparent to those skilled in the art upon review of the following detailed description, claims and drawings in which like numerals are used to designate like features.

Figure 1:
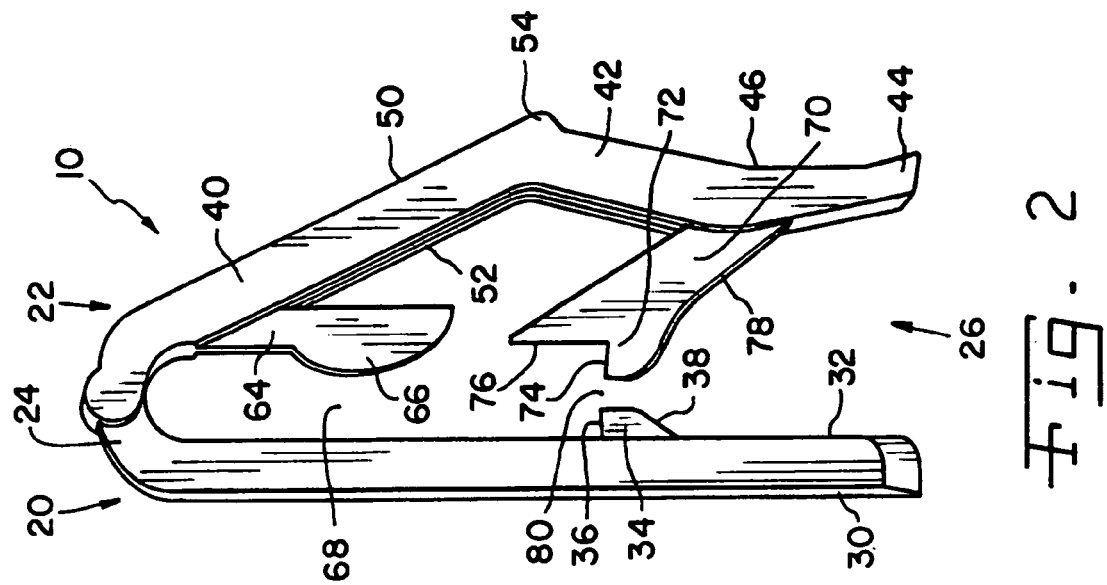
FIG. 1 is a perspective view of a one-sided rib clip in accordance with the present invention.
Figure 2:
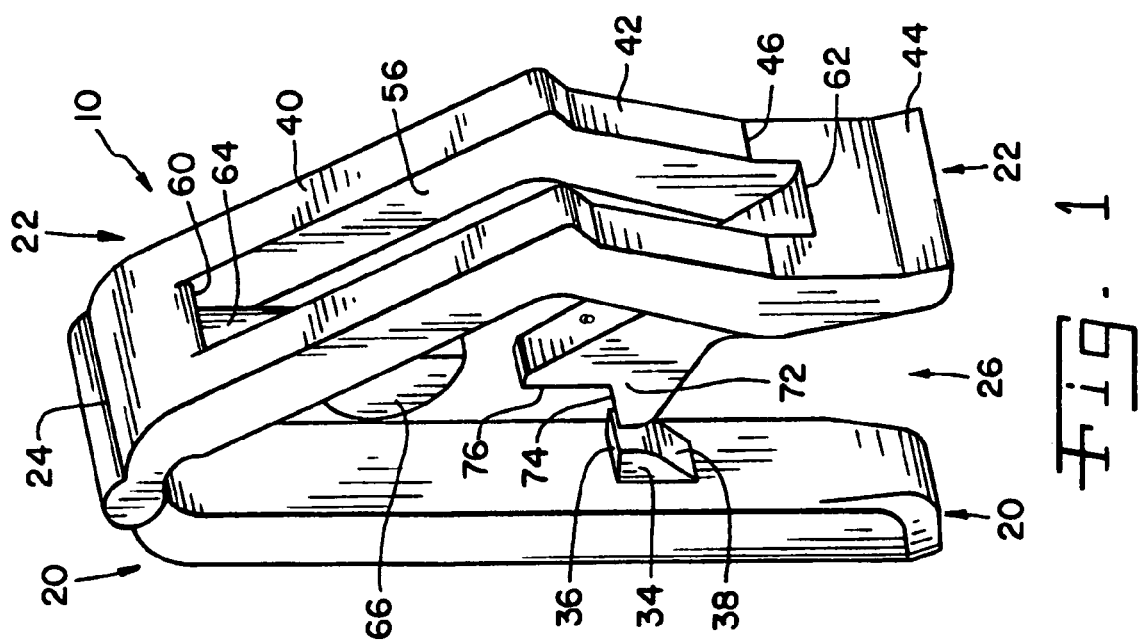
FIG. 2 is an elevational view of the rib clip according to the present invention, shown in FIG. 1.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Figure 3:
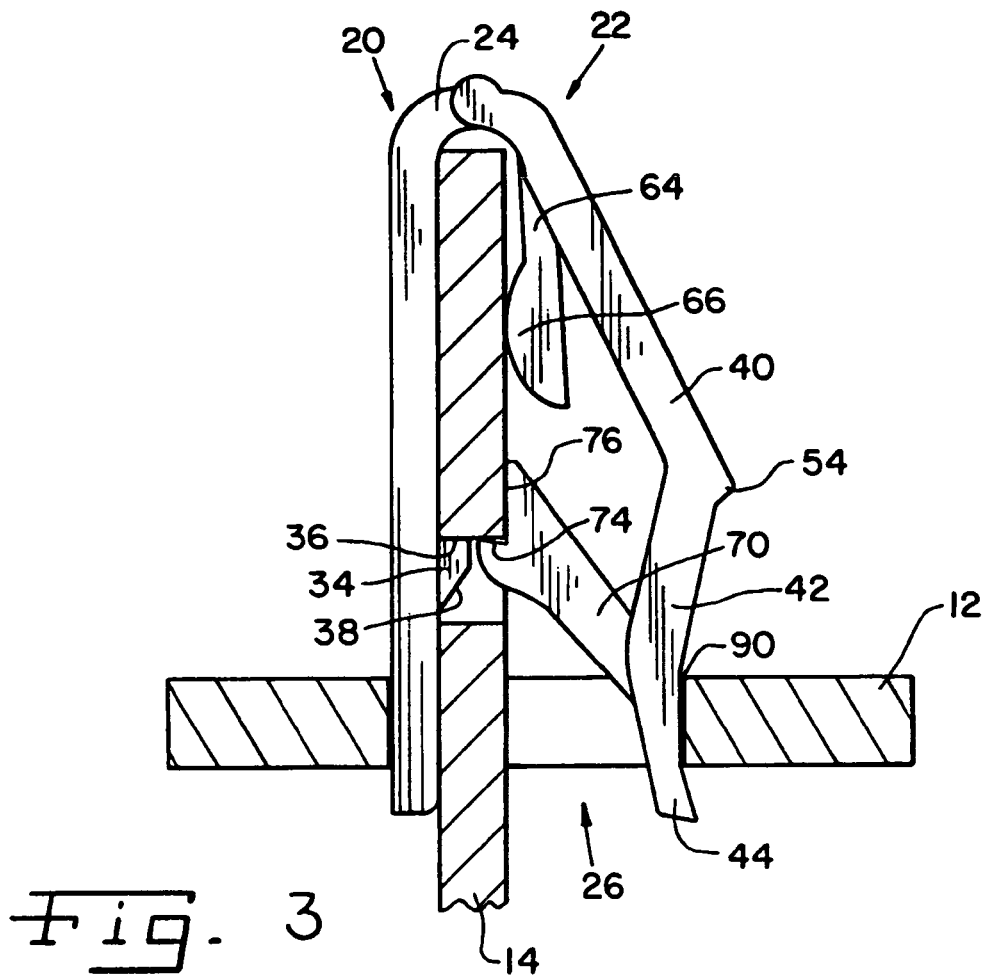
FIG. 3 is an elevational view similar to that of FIG. 2, but illustrating the rib clip installed in a first component and holding a second component, with the first and second components shown in cross-section.
Figure 4:
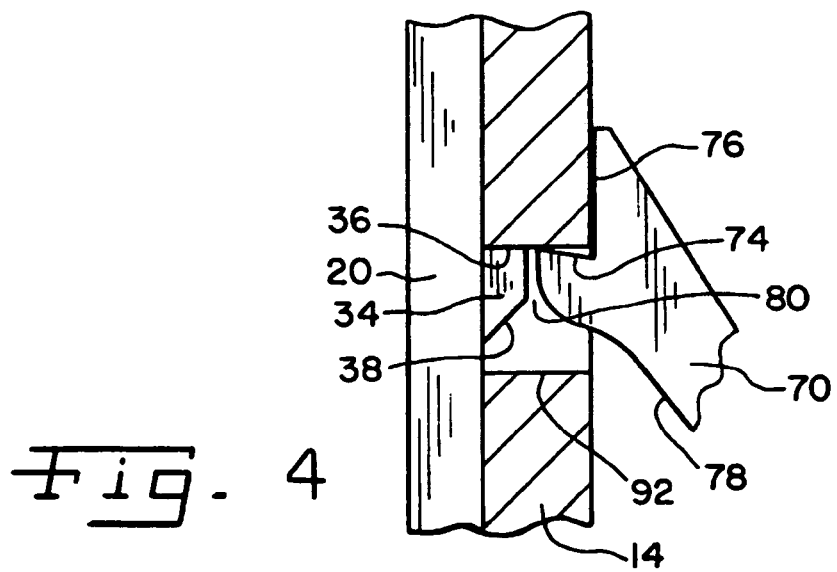
FIG. 4 is an enlarged fragmentary view of a portion of the rib clip shown in FIG. 3

Referring now more specifically to the drawings and to FIG. 1 in particular, a rib clip 10 in accordance with the present invention is shown. Rib clip 10 is configured for installation in a first component 12 and for receiving a second component 14 therein. Rib clip 10 thereby is provided for securing first and second components 12 and 14 together. Installed configurations for rib clip 10 in first and second components 12 and 14 are shown in FIGS. 3 and 4.

Rib 10 can be provided in different sizes for different applications and uses. Rib clip 10 is particularly suited for providing in smaller sizes to secure smaller components. Rib clip 10 can be provided in different materials and is particularly suited for manufacture by molding of plastic or the like. As those skilled in the art will understand readily, in many applications and uses of rib clip 10 a plurality thereof will be provided for holding a single second component to a first component or components. For example, when holding an elongated narrow piece of trim in an automobile, a plurality of rib clips 10 will be provided at spaced locations along the length of the molding to secure the molding in place.

Rib clip 10 includes a first leg 20 and a second leg 22 joined at one end by a curved transition 24. First leg 20 and second leg 22 are spaced from each other and define an entrance 26 at the opposite, distal ends thereof. Rib clip 10 is a monolithic body including first leg 20, second leg 22 and transition 24, in addition to the further components to be described hereinafter. First leg 20 and second leg 22 are deflectable relative to each other at transition 24 so that clip 10 can be compressed by pushing legs 20 and 22 one toward the other.

First leg 20 is a substantially straight segment of clip 10 and has an outer surface 30 and an inner surface 32. A shelf 34 is provided on inner surface 28 in a substantially fixed position relative to first leg 20. Shelf 34 includes a support surface 36 extending generally laterally from inner surface 32 and facing toward transition 24. Shelf 34 further includes an angular face 38 projecting angularly from inner surface 32 and being generally exposed toward entrance 26.

Second leg 22 defines an angular segment of clip having a proximal segment 40 and a distal segment 42 relative to transition 24. Proximal segment 40 extends at a first outward angle relative to first leg 20, and distal segment 42 extends from proximal segment 40 at a second, lesser angle relative to first leg 20. In the exemplary embodiment, a first portion of distal segment 42 extends from proximal segment 40 inwardly relative to first leg 20 and has a foot 44 extending again outwardly relative to first leg 20. A hollow 46 is formed at the area of the transition between inward angled distal segment 42 and outward angled foot 44.

Second leg 22 has an outer surface 50 and an inner surface 52 throughout proximal segment 40 and distal segment 42. An outwardly projecting transverse protuberance 54 is provided on outer surface 52 at the transition between proximal segment 40 and distal segment 42. Second leg 22 defines a slot 56 therein extending through portions of both proximal segment 40 and distal segment 42, with slot 56 thereby bisecting protuberance 54.

Slot 56 has a proximal slot end 60 and a distal slot end 62 relative to transition 24. An inner arm 64 is provided connected to second leg 22 at proximal slot end 60. Inner arm 64 is substantially parallel to first leg 20 and includes a semi bulbous enlargement 66 at an end thereof facing toward inner surface 32 of first leg 20. A gap 68 is defined between enlargement 66 and inner surface 32.

An outer arm 70 is provided connected to second leg 22 at distal slot end 62. Outer arm 70 extends inwardly angularly from distal slot end 62 toward inner surface 32 and transition 24. Outer arm 70 defines a ledge 72 having a ledge support surface 74 and a wall 76. Ledge support surface 74 substantially aligns with support surface 36 of shelf 34, and wall 76 is substantially parallel to inner surface 32. An entrance face 78 of outer arm 70 is exposed toward entrance 26 and defines a smoothly transitioning path from second leg 22 toward the end of outer arm 70 and a gap 80 defined between shelf 34 and the inner-most end of outer arm 70.

Inner arm 64 and outer arm 70 are connected to second leg 22 only at proximal slot end 60 and distal slot end 62, respectively. Accordingly, inner arm 64 and outer arm 70 each are cantilevered and deflectable in position relative to second leg 22.

In a completed assembly, rib clip 10 is received in a first window or opening 90 in first component 12. A width dimension of window or opening 90 is a selected to compress second leg 22 toward first leg 20 in a completed assembly. Second component 14 is a blade-like structure and defines a second window or opening 92. Second component 14 has a width or thickness slightly less than gap 68.

During installation and use, rib clip 10 can be installed on second component 14 by inserting blade-like a second component 14 through entrance 26. A leading face or surface of second component 14 engages angled face 38 of shelf 14 and/or entrance face 78 of outer arm 70. Second component 14 is directed thereby toward gap 80 between shelf 34 and outer arm 70. Outer arm 70 is deflected as the second component 14 is pushed into rib clip 10, allowing second component 14 to pass through the then enlarged gap 80. Slot 56 provides a receiving location in which outer arm 70 can be deflected. As second component 14 moves toward full insertion in rib clip 10, the leading edge thereof slides past bulbous enlargement 66 toward transition 24, with inner arm 64 deflecting as necessary to allow the insertion of second component 14 between inner surface 32 and bulbous enlargement 66. As second window 92 aligns with shelf 34 and ledge 72, shelf 34 and ledge 72 extend into second window 92, with an edge of second window 92 being supported by shelf support surface 36 and ledge support surface 74. Wall 76 confronts a surface of second component 14 adjacent second window 92. Inner arm 64 and outer arm 70 thereby provide biasing force against second component 14 toward first leg 20.

An assembly of rib clip 10 and second component 14 can be connected to first component 12 by aligning transition 24 with first window or opening 90 and pushing the assembly into first window or opening 90. As proximal segment 40 engages and slides through first window or opening 90, second leg 22 is flattened or deflected toward first leg 20. Again, slot 56 provides a region in which portions of inner arm 64 and outer arm 70 can be received as second leg 22 moves or flattens toward first leg 20. As protuberance 54 passes through first window or opening 92, second leg 22 rebounds outwardly relative to first leg 20. Protuberance 54 overlaps first component 12 adjacent first window or opening 90 in a manner such that extraction all of rib clip 10 from a first component 12 is resisted substantially by protuberance 54, and rib clip 10 is held securely in first component 12. Foot 44 inhibits over insertion of rib clip 10 relative to first component 12.

A width dimension of first window or opening 90 is selected so that some compressive force remains against first leg 20 and second leg 22 when first component 12 reaches a final position in hollow 46, between protuberance 54 and foot 44. Outer arm 70 is thereby held toward shelf 34 with gap 80 being minimal. Bulbous enlargement 66 and wall 76 are biased against second component 14 and urge second component 14 against inner surface 32 of first leg 20. Shelf support surface 36 and ledge support surface 74 each project into window or opening 92 such that extraction of second component 14 is inhibited. Extraction force pulling second component 14 outwardly relative to entrance 26 pulls downwardly against both shelf 34 and ledge 72, urging outer arm 70 downwardly and pushing wall 76 more forcefully against second component 14. Extraction force on second component 14 causes additional force to urge second component 14 against first leg 20, which in turn is restrained by first component 12. Thus, the completed assembly of rib clip 10, first component 12 and second component 14 is secure, being held in a triangular clamping arrangement of first window or opening 90 against first and second legs 20 and 22, and second window or opening 92 against shelf support surface 36 and ledge support surface 74.

FIG. 4 illustrates a feature of the present invention to enhance retention of second part 14 in clip 10. An angle defined between ledge support surfaces 74 and the wall 76 is less than a right angle, i.e. less than 90°. Accordingly, extractive force on second component 14 causes a surface defining second window or opening 92 to push ledge 72 downwardly, forcing wall 76 against second component 14 and in turn wedging second component 14 more forcefully between outer arm 70 and inner surface 32. A triangular binding arrangement is provided by first window 90 compressive rib clip 10 by engagement with outer surfaces 30 and 50 on opposite sides of clip 10, and second component 14 engaged against support surfaces 36 and 74.

Second component 14 is urged firmly against inner surface 32 by both inner arm 64 and outer arm 70. With clip 10 being compressed within first component 12, clip 10 and components 12 and 14 are held firmly with respect to each other, thereby reducing relative movement between the parts and minimizing BSR.

While it is anticipated that many uses of rib clip 10 will include connection of rib clip 10 to second component 14 in a preassembled form as described above, with the preassembly of rib clip 10 and second component 14 thereafter being connected to first component 12, it should be understood that the connection can be reversed. Rib clip 10 can first be connected to first component 12 by inserting into first window 90 as described above. Thereafter, second component 14 can be inserted into entrance 26. With each of inner arm 64 and outer arm 70 being connected only at one end, and with slot 56 provided there between, inner and outer arms 64 and 70 can be deflected as necessary to allow the insertion of second component 14 even as first component 12 urges first and second legs 20 and 22 toward each other. After both components 12 and 14 have been positioned as shown and described with respect to each other and rib clip 10, the retention all of clip 10 in first component 12 and second component 14 in clip 10 is solid and secure, regardless of the order in which the components and the clip are connected.

Clip 10 is easily manufactured in a one shot molding process. Rib clip 10 is easily connected to first component 12 and to second component 14, with each component provided only with a window or opening therein. The assembly with components 12 and 14 requires no specialized, complex and difficult to manufacture structure such as a doghouse or the like commonly required for other fastening clips. Further, it should be understood that second window 92 need not extend completely through second component 14. Ledge 72 and shelf 34 can be received in depressions in second part 14. As yet another alternative, if second part 14 is soft or pliable ledge 72 and shelf 34 can pierce or embed into second component 14. Extraction force exerted on second component 14 will simply tend to embed ledge 72 and shelf 34 more deeply into second component 14.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A connecting clip comprising:
   first and second legs connected at one end of said clip and defining a clip entrance therebetween at an opposite end of said clip;
   said first leg having a first leg inner surface and a shelf on said first leg inner surface, said shelf including a support surface extending laterally from said first leg inner surface and an angular face projecting angularly from said first leg inner surface, said shelf being in substantially fixed position relative to said first leg; and
   a deflectable arm extending from said second leg near said entrance, said arm extending inwardly in said clip toward said first leg and defining a ledge having a ledge support surface directly across from and near said lateral support surface, said deflectable arm being deflectable relative to said second leg.

2. The connecting clip of claim 1, said deflectable arm being a cantilevered outer arm relative to the connected ends of said legs, and said second leg further including a deflectable cantilevered inner arm defining a gap with said inner surface of said first leg.

3. The connecting clip of claim 2, said inner arm including a bulbous enlargement at an end thereof.

4. The connecting clip of claim 1, said second leg having a proximal segment and a distal segment defining a non-linear angle.

5. The connecting clip of claim 4, said second leg having an outwardly directed protuberance at a transition between said proximal segment and said distal segment.

6. A connecting clip comprising:
   first and second legs connected at one end of said clip and defining a clip entrance therebetween at an opposite end of said clip;
   said first leg having a first leg inner surface and a lateral support surface projecting from said first leg inner surface in substantially fixed position relative to said first leg inner surface; and
   a deflectable arm extending from said second leg near said entrance, said arm extending inwardly in said clip toward said first leg and defining a ledge having a ledge support surface near said lateral support surface;
   said deflectable arm being an outer arm relative to the connected ends of said legs, and said second leg further including a deflectable inner arm defining a gap with said inner surface of said first leg; and
   said second leg defining a slot, said inner arm connected to said second arm at one end of said slot and said outer arm connected to said second arm at an opposite end of said slot.

7. The connecting clip of claim 6, said ledge defining a wall adjacent said ledge support surface.

8. The connecting clip of claim 7, said wall and said ledge support surface defining an angle therebetween less than 90°.

9. The connecting clip of claim 8, said second leg having an outer surface defining a lateral outwardly directed protuberance thereon.

10. The connecting clip of claim 9, said second leg having an outwardly directed foot at a distal end thereof.

11. An assembly of a first component and a second component interconnected by a rib clip, said first component defining a first window and said second component defining a second window, said assembly comprising:
   said rib clip having a first leg and a second leg connected at one end by a transition, said first leg and said second leg having spaced distal ends defining an entrance;
   said clip being disposed in said first window of said first component, said first component biasing said first and second legs toward each other;
   said second component disposed between said first leg and said second leg;
   said first leg having a first leg inner surface and a shelf on said first leg inner surface, said shelf including a support surface extending laterally from said first leg inner surface and an angular face projecting angularly from said first leg inner surface, said shelf being in substantially fixed position relative to said first leg and being disposed in said second window; and
   a deflectable arm extending from said second leg near said entrance, said arm extending inwardly in said clip toward said first leg and defining a ledge having a ledge support surface near said lateral support surface and disposed in said second window, said deflectable arm being deflectable relative to said second leg, said deflectable arm being an outer arm relative to the connected ends of said legs, and said second leg further including a deflectable cantilevered inner arm biased against said second component.

12. The assembly of claim 11, said inner arm including a bulbous enlargement at an end thereof biased against said second component.

13. An assembly of a first component and a second component interconnected by a rib clip, said first component defining a first window and said second component defining a second window, said assembly comprising:
   said rib clip having a first leg and a second leg connected at one end by a transition, said first leg and said second leg having spaced distal ends defining an entrance;
   said clip being disposed in said first window of said first component, said first component biasing said first and second legs toward each other;
   said second component disposed between said first leg and said second leg;
   said first leg having a first leg inner surface and a lateral support surface projecting from said first leg inner surface in substantially fixed position relative to said first leg inner surface and being disposed in said second window; and
   a deflectable arm extending from said second leg near said entrance, said arm extending inwardly in said clip toward said first leg and defining a ledge having a ledge support surface near said lateral support surface and disposed in said second window;
   said deflectable arm being an outer arm relative to the connected ends of said legs, and said second leg further including a deflectable inner arm biased against said second component; and
   said second leg defining a slot, said inner arm connected to said second anti at one end of said slot and said outer arm connected to said second arm at an opposite end of said slot.

14. The assembly of claim 13, said that ledge defining a wall adjacent said ledge support surface.

15. The assembly of claim 14, said wall and said ledge support surface defining an angle therebetween less than 90°.

16. The assembly of claim 11, said second leg having a proximal segment and a distal segment defining a non-linear angle.

17. The assembly of claim 16, said second leg having an outwardly directed protuberance at a transition between said proximal segment and said distal segment.

18. A one-sided rib clip comprising:
   first and second legs connected at one end of said clip and defining a clip entrance therebetween at an opposite end of said clip;
   said first leg being substantially straight and having a first leg inner surface;
   a shelf disposed on said first leg inner surface, said shelf being in a substantially fixed position with respect to said first leg and having a shelf support surface facing said connected ends of said legs and an angled face toward said entrance;
   said second leg having proximal and distal segments relative to said one end of said clip, said segments defining a nonlinear angle;
   a delectable inner arm connected to said proximal segment of said second leg and extending toward said entrance substantially parallel to said first leg;
   a delectable outer arm extending from said distal segment angularly away from said entrance into said clip and toward said shelf, said outer arm defining a ledge at an end thereof including a support surface and a wall.

19. The one-sided rib clip of claim 18, said second leg having an outer surface defining a lateral protuberance at a transition between said proximal and distal segments, an outwardly projecting foot on said distal segment, and a hollow between said protuberance and said foot.

* * * * *